United States Patent
Sumiya et al.

(10) Patent No.: US 10,217,484 B2
(45) Date of Patent: Feb. 26, 2019

(54) METALLIC PLATE AND RECORDING TAPE CARTRIDGE

(71) Applicant: FUJIFILM CORPORATION, Minato-ku, Tokyo (JP)

(72) Inventors: Yosuke Sumiya, Kanagawa (JP); Katsuki Asano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 734 days.

(21) Appl. No.: 14/799,575

(22) Filed: Jul. 15, 2015

(65) Prior Publication Data
US 2016/0086630 A1 Mar. 24, 2016

(30) Foreign Application Priority Data
Sep. 19, 2014 (JP) .................... 2014-191759

(51) Int. Cl.
*F16D 11/14* (2006.01)
*G11B 15/18* (2006.01)
(Continued)

(52) U.S. Cl.
CPC ........ *G11B 15/1883* (2013.01); *G11B 23/043* (2013.01); *G11B 23/107* (2013.01); *F16D 11/14* (2013.01)

(58) Field of Classification Search
CPC . G11B 15/1883; G11B 23/107; G11B 23/043; F16D 11/14; F16C 17/04
(Continued)

(56) References Cited

U.S. PATENT DOCUMENTS 6,452,748 B1 * 9/2002 Shima .................. G11B 23/043
360/132
6,886,765 B2 * 5/2005 Amano ................ G11B 23/107
242/338.1
(Continued)

FOREIGN PATENT DOCUMENTS

JP H02-135230 U 11/1990
JP 2003-091955 A 3/2003
(Continued)

OTHER PUBLICATIONS

English language translation of the following: Office action dated Nov. 15, 2016 from the JPO in a Japanese patent application No. 2014-191759 corresponding to the instant patent application. This office action translation is submitted now in order to supplement the understanding of the cited references which are being disclosed in the instant Information Disclosure Statement.

*Primary Examiner* — William A. Rivera
(74) *Attorney, Agent, or Firm* — Solaris Intellectual Propery Group, PLLC

(57) ABSTRACT

A metallic plate that is a structure of a release member, the release member being configured to be integrally rotatable with a reel accommodated in a case, and the release member moving a locking member from a locking position, at which the locking member locks rotation of the reel relative to the case, to an allowing position, at which the locking member allows rotation of the reel. The metallic plate comprises a touching surface that is to be touched by a distal end of a sliding protrusion portion that protrudes from the locking member; and a structure such that, if a plurality of the metallic plate are stacked in a plate thickness direction in a state in which the metallic plates are not attached to release members, the touching surface of each metallic plate is not in contact with any other of the metallic plates.

2 Claims, 11 Drawing Sheets

(51) Int. Cl.
*G11B 23/04* (2006.01)
*G11B 23/107* (2006.01)

(58) Field of Classification Search
USPC ........................................................ 384/426
See application file for complete search history.

(56) References Cited

U.S. PATENT DOCUMENTS

| | | | | |
|---|---|---|---|---|
| 7,168,649 B2* | 1/2007 | Hiraguchi | .............. | G11B 15/32 |
| | | | | 242/340 |
| 7,600,710 B2* | 10/2009 | Sumiya | .................. | B65H 75/30 |
| | | | | 242/332.4 |
| 7,644,886 B2* | 1/2010 | Ishikawa | ................. | B65H 75/14 |
| | | | | 242/348 |
| 7,857,250 B2* | 12/2010 | Takenoshita | ......... | G11B 23/107 |
| | | | | 242/338.1 |
| 8,851,411 B2* | 10/2014 | Mori | .................... | G11B 23/037 |
| | | | | 242/348.2 |
| 2002/0108250 A1* | 8/2002 | Herndon | ................... | F16C 3/10 |
| | | | | 29/898 |
| 2003/0132332 A1* | 7/2003 | Amano | ................. | G11B 23/107 |
| | | | | 242/348 |
| 2004/0232266 A1 | 11/2004 | Hiraguchi | | |
| 2004/0262437 A1* | 12/2004 | Hiraguchi | .............. | G11B 15/32 |
| | | | | 242/338.1 |
| 2005/0127224 A1* | 6/2005 | Ishikawa | .............. | G11B 23/043 |
| | | | | 242/338.1 |
| 2007/0200020 A1* | 8/2007 | Suzuki | ................... | G11B 15/32 |
| | | | | 242/348 |
| 2008/0277519 A1* | 11/2008 | Mori | .................... | G11B 23/043 |
| | | | | 242/348 |
| 2011/0192929 A1* | 8/2011 | Hiraguchi | ............ | G11B 23/044 |
| | | | | 242/348 |
| 2016/0086630 A1* | 3/2016 | Sumiya | ................. | G11B 23/043 |
| | | | | 242/394 |

FOREIGN PATENT DOCUMENTS

| | | |
|---|---|---|
| JP | 2003-100051 A | 4/2003 |
| JP | 2003-187548 A | 7/2003 |
| JP | 2004-348839 A | 12/2004 |

* cited by examiner

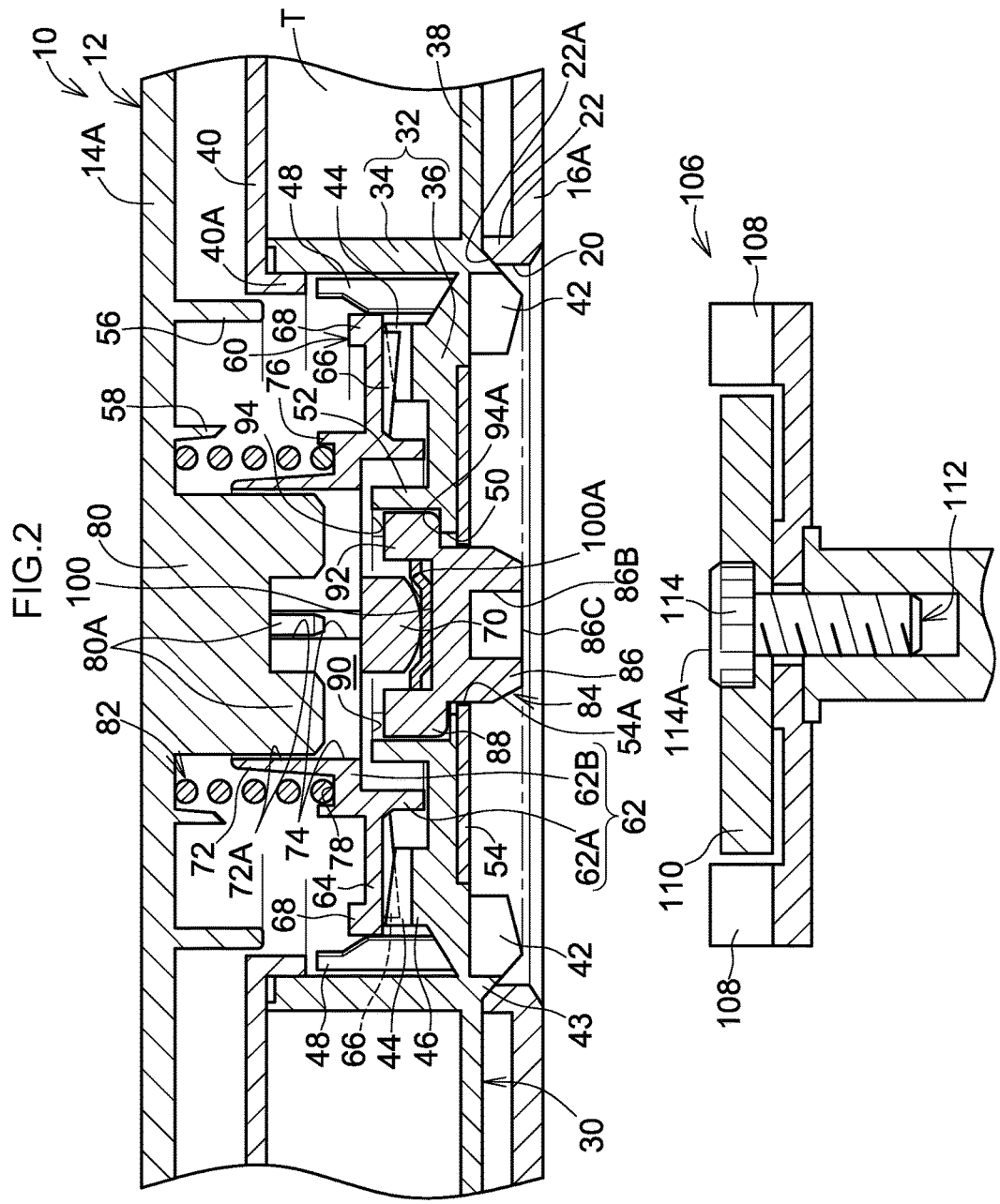

METALLIC PLATE AND RECORDING TAPE CARTRIDGE

CROSS-REFERENCE TO RELATED APPLICATION

This application claims priority under 35 USC 119 from Japanese Patent Application, No. 2014-191759 filed Sep. 19, 2014, the disclosure of which is incorporated by reference herein.

BACKGROUND OF THE INVENTION

Technical Field

The present invention relates to a recording tape cartridge that rotatably accommodates a single reel on which a recording tape such as a magnetic tape or the like is wound, and to a metallic plate that structures a release member provided in the recording tape cartridge.

Related Art

A recording tape cartridge that has been known heretofore rotatably accommodates a single reel, on which a recording tape such as a magnetic tape or the like is wound, inside a case. This recording tape cartridge enables a reduction in accommodation space during storage and may record large volumes of data. This recording tape cartridge is equipped with a locking member, which is for locking the reel so as not to rotate inside the case at times of non-use, and a release member, which is for releasing the locking of the locking member at times of use.

During use of the recording tape cartridge, that is, during rotation of the reel, a spherical surface-shaped protrusion portion of the locking member and a flat surface-shaped touching surface of the release member, which are both resin members, slidingly contact one another. Accordingly, as disclosed in, for example, Japanese Patent Application Laid-Open (JP-A) No. 2004-348839, in the light of increasing rotation speeds aimed at shortening access times to desired recording positions and data, a recording tape cartridge has been proposed heretofore in which a metallic plate that structures the touching surface is provided at the release member.

SUMMARY

However, when a metallic plate is provided at a release member and serves as a touching surface, if the touching surface is damaged (for example, if the arithmetic mean roughness becomes 0.3 µm or more), there is concern that behavior of the release member with respect to a protrusion portion of a locking member may become disordered during rotation of the reel.

Then, if the behavior of the release member during the rotation of the reel is disordered, there is concern that the protrusion portion of the locking member may receive, for example, diametric direction force components from the touching surface of the release member, and that consequently noise will be generated during the rotation of the reel.

Accordingly, the present invention provides a metallic plate that may suppress damage to a touching surface that touches the locking member, and a recording tape cartridge that is provided with a release member that includes this metallic plate.

In order to achieve the object described above, a metallic plate according to a first aspect of the present invention is a structure of a release member, the release member being configured to be integrally rotatable with a reel accommodated in a case, and the release member moving a locking member from a locking position, at which the locking member locks rotation of the reel relative to the case, to an allowing position, at which the locking member allows rotation of the reel, the metallic plate including: a touching surface that is to be touched by a distal end of a sliding protrusion portion that protrudes from the locking member; and a structure such that, if a plurality of the metallic plate that are not attached to release members are stacked in a plate thickness direction, the touching surface provided at each metallic plate is not in contact with any other of the metallic plates.

Further, a recording tape cartridge according to the present invention includes: a reel at which a recording tape is wound onto a reel hub whose shape is a circular tube with a bottom portion, the reel being rotatably accommodated in a case; a locking member that is provided in the reel hub to be movable in an axial direction of the reel, the locking member movable to a locking position, at which the locking member locks rotation of the reel, and an allowing position, at which the locking member allows rotation of the reel relative to the case; a release member that is provided in the reel hub to be integrally rotatable with the reel, the release member moving the locking member from the locking position to the allowing position when the release member is pushed from an outer side of the case; a sliding protrusion portion that protrudes from the locking member toward the side thereof at which the release member is disposed; and a metallic plate according to claim 1, the metallic plate being a structure of the release member.

According to the present invention, damage to a touching face, which touches a locking member, of a metallic plate that structures a release member provided in a recording tape cartridge may be suppressed.

BRIEF DESCRIPTION OF THE DRAWINGS

Embodiments of the present invention will be described in detail based on the following figures, wherein:

FIG. 2 is a sectional diagram showing a reel of the recording tape cartridge in accordance with the exemplary embodiment of the present invention when locked;

DETAILED DESCRIPTION OF THE INVENTION

Figure 1A:
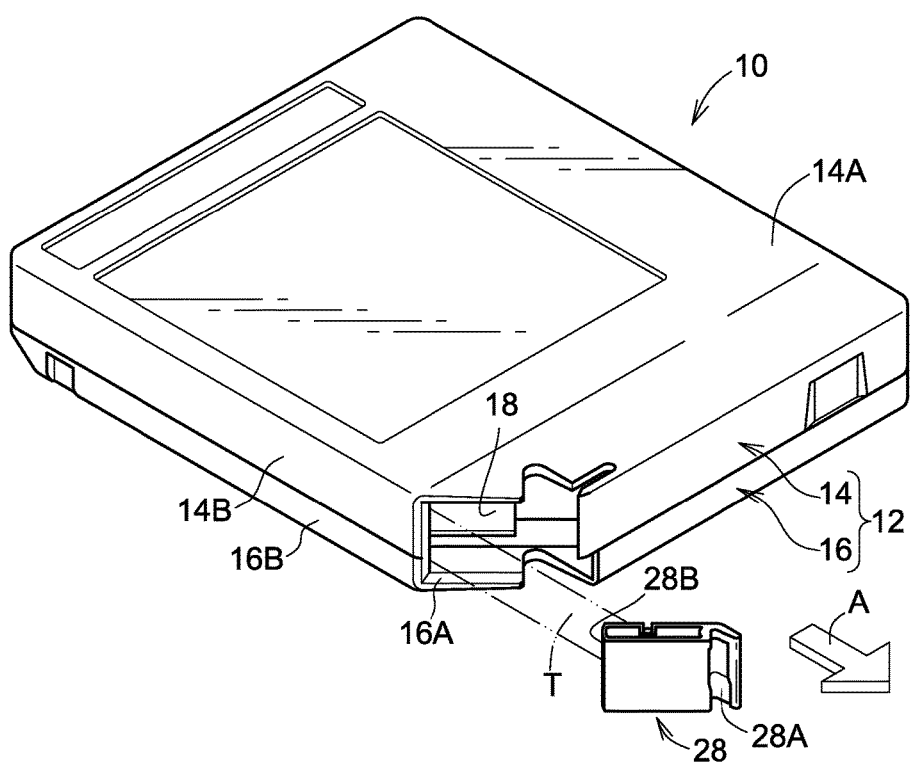
FIG. 1A is a perspective view showing a recording tape cartridge in accordance with an exemplary embodiment of the present invention, viewed from above.

Herebelow, an exemplary embodiment relating to the present invention is described in detail in accordance with the drawings. An arrow A shown in FIG. 1B represents a loading direction of a recording tape cartridge 10 into a drive device (not shown in the drawings). For convenience of description, the side indicated by arrow A is referred to as the front side of the recording tape cartridge 10.

Figure 1B:
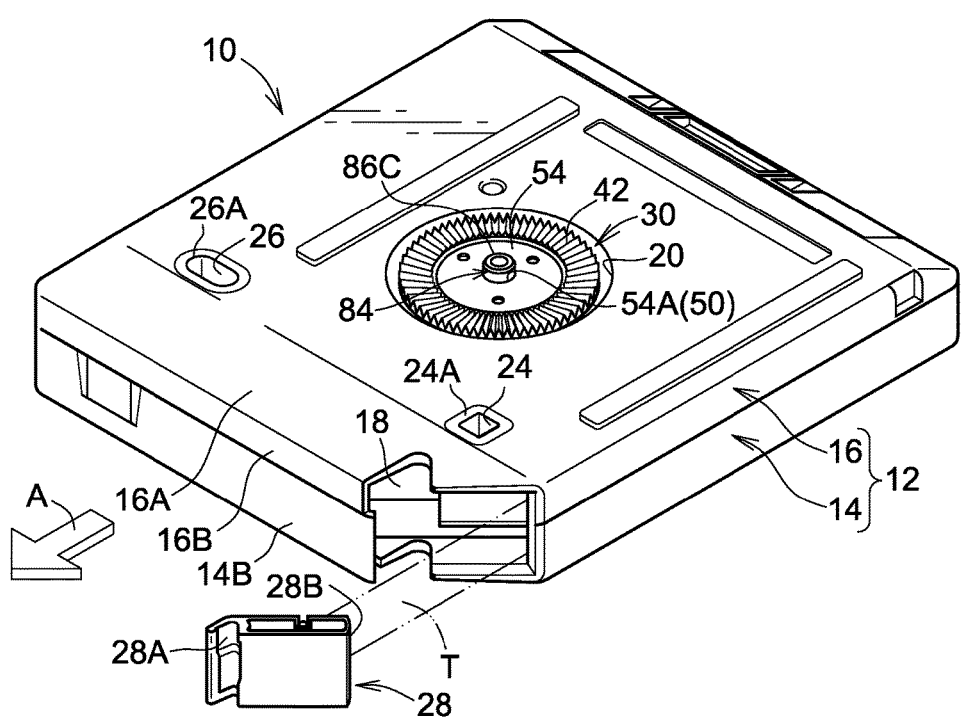
FIG. 1B is a perspective view showing the recording tape cartridge in accordance with the exemplary embodiment of the present invention, viewed from below.

As shown in FIG. 1A and FIG. 1B, the recording tape cartridge 10 is provided with a case 12. The case 12 is structured by an upper case 14 and a lower case 16 being joined together. Specifically, the upper case 14 is structured by a periphery wall 14B with a substantial frame shape standing along an outer edge of a ceiling plate 14A with a substantially rectangular shape in plan view, and the lower case 16 is structured by a periphery wall 16B standing along an outer edge of a floor plate 16A with a shape substantially corresponding with the ceiling plate 14A. The case 12 is formed into a substantially rectangular box shape by the upper case 14 and the lower case 16 being joined, by ultrasonic welding, screw-fastening or the like, in a state in which the open end of the periphery wall 14B is matched up with the open end of the periphery wall 16B.

An aperture 18, which is angled with respect to the loading direction in plan view, is formed in the case 12 by the ceiling plate 14A, the periphery wall 14B, the floor plate 16A and the periphery wall 16B being respectively cut away at a corner portion of the case 12 at the leading side in the direction of loading into the drive device. A circular gear aperture 20 that penetrates through the floor plate 16A is provided at a substantially central portion of the floor plate 16A. The gear aperture 20 is for exposing a reel gear 42, which is described below, and the like. An annular rib 22 (see FIG. 2) is provided at the floor plate 16A, protruding toward the interior side of the case 12 from an edge portion of the gear aperture 20. The annular rib 22 is for positioning of a reel 30, which is described below.

A pair of positioning holes 24 and 26 open at a front end vicinity of an outer face of the floor plate 16A of the case 12. The pair of positioning holes 24 and 26 is provided in pocket shapes in projection portions (not shown in the drawings) that stand to the interior side of the case 12 from the floor plate 16A. In a bottom view, the positioning holes 24 and 26 are disposed to be spaced apart from one another on an imaginary line that is orthogonal to the loading direction. One of the positioning holes 24, which is closer to the aperture 18, is formed in a substantially square shape in bottom view. The one positioning hole 24 is to contact the exterior of a positioning pin of the drive device. Another of the positioning holes 26, which is further from the aperture 18, is formed as a long hole that extends along the imaginary line and whose width corresponds to the diameter of another positioning pin.

Therefore, when the recording tape cartridge 10 is loaded in the drive device and the respective positioning pins are inserted into the positioning holes 24 and 26, the recording tape cartridge 10 is precisely positioned in horizontal (left-and-right and front-and-rear) directions in the drive device.

Regions of the floor plate 16A around the positioning holes 24 and 26 serve as positioning surfaces 24A and 26A that are finished to a higher smoothness than other regions (design surfaces). When the positioning pins are inserted into the positioning holes 24 and 26, the positioning surfaces 24A and 26A abut against positioning surfaces of the drive device, which are provided around the positioning pins. Therefore, the recording tape cartridge 10 is precisely positioned in the vertical (up-and-down) direction in the drive device.

The reel 30, which is described below, is singly accommodated inside the case 12 to be rotatable. A magnetic tape T that serves as a recording tape is wound onto the reel 30. A leader block 28 that serves as a leader member is attached to a distal end of the magnetic tape T. When the recording tape cartridge 10 is not in use, the leader block 28 is accommodated and retained at the inner side of the aperture 18 of the case 12. Thus, the leader block 28 closes off the aperture 18 and blocks the ingression of dust or the like into the case 12.

An engaging slot portion 28A is formed at the distal end of the leader block 28. When the magnetic tape T is to be pulled out inside the drive device, the leader block 28 is disengaged from the case 12 and guided to a take-up reel (not shown in the drawings) of the drive device by a pull-out member that engages with the engaging slot portion 28A. An end face of the leader block 28 at the opposite side thereof from the side at which the engaging slot portion 28A is disposed is formed as a circular arc face 28B. The leader block 28 is fitted into the take-up reel and the circular arc face 28B structures a portion of a take-up surface onto which the magnetic tape T is taken up.

Figure 3:
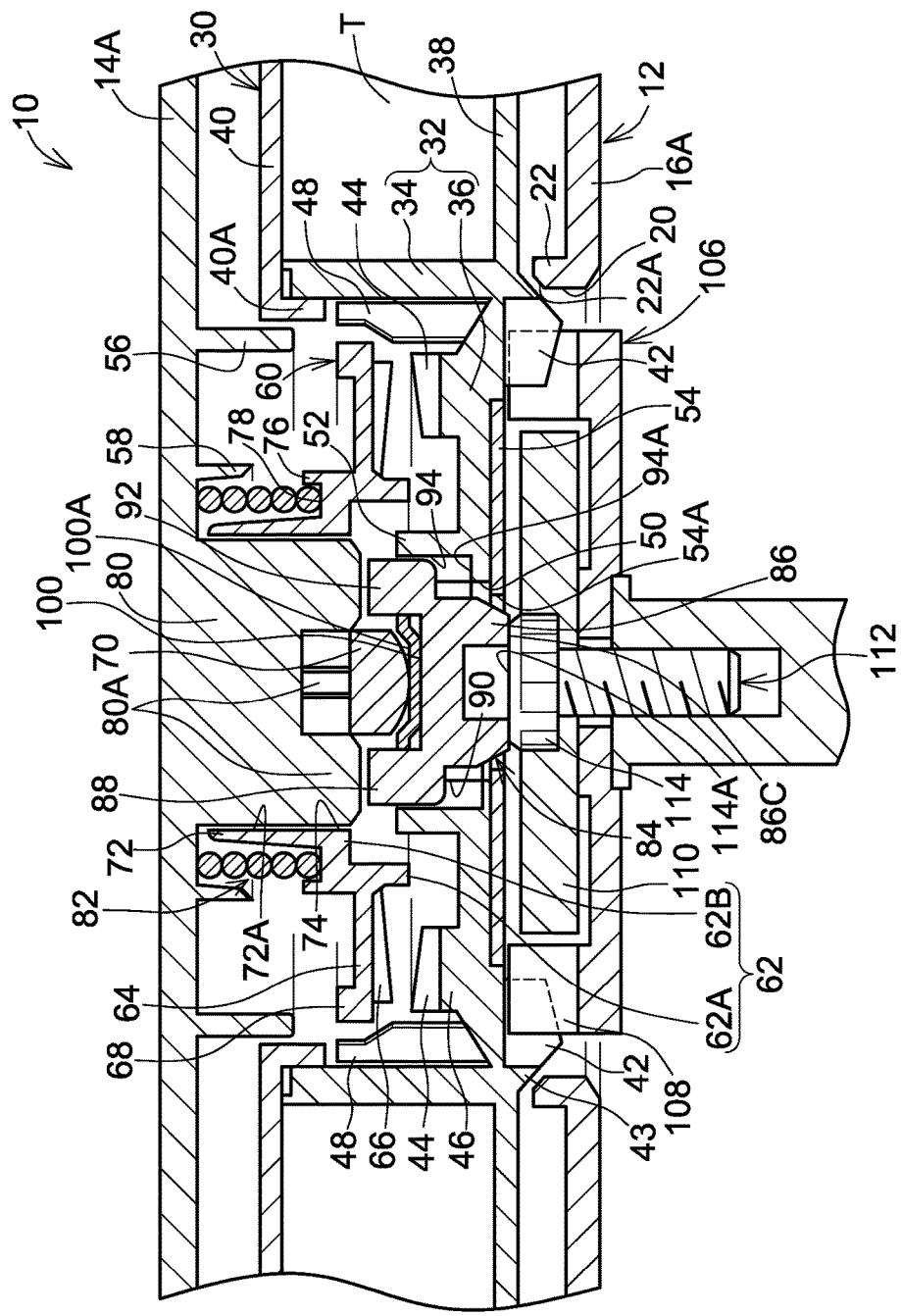
FIG. 3 is a sectional diagram showing the reel of the recording tape cartridge in accordance with the exemplary embodiment of the present invention when locking is released.
Figure 4:
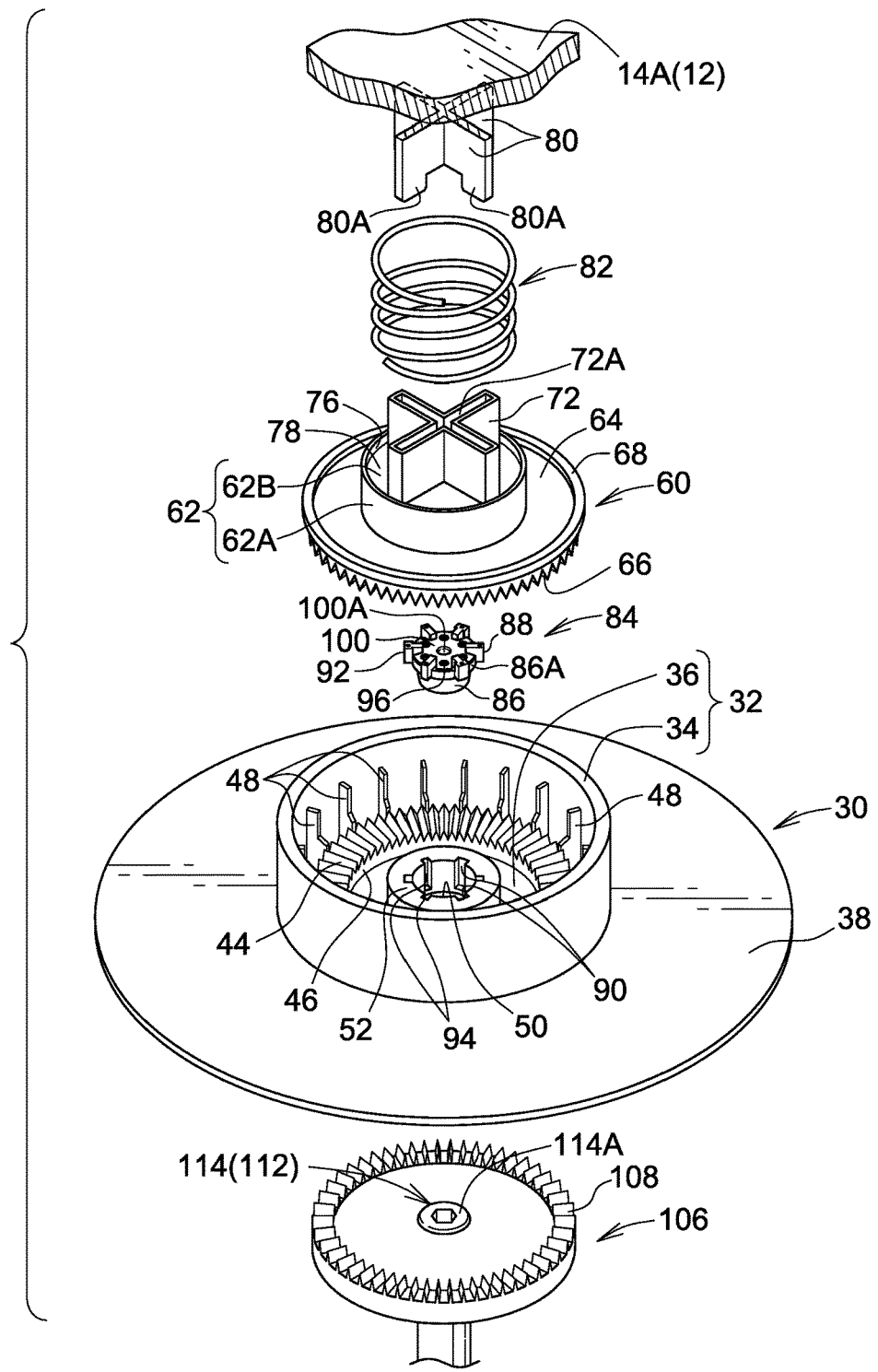
FIG. 4 is an exploded perspective view showing a locking member that structures the recording tape cartridge in accordance with the exemplary embodiment of the present invention and a rotary shaft of a drive device, viewed from above.

As shown in FIG. 2 to FIG. 4, the reel 30, which is fabricated of resin, is provided with a reel hub 32 that structures an axial center portion of the reel 30. The reel hub 32 is formed substantially in the shape of a circular tube with a bottom, including a tube portion 34 and a bottom portion 36. The magnetic tape T is wound onto an outer periphery face of the tube portion 34. The bottom portion 36 closes off a lower portion of the tube portion 34. A lower flange 38 is provided extending to the diametric direction outer side from a vicinity of a lower end portion at the bottom portion 36 side of the reel hub 32, coaxially and integrally therewith.

An upper flange 40 (not shown in FIG. 4) is joined to an upper end portion of the reel hub 32. An outer diameter of the upper flange 40 is the same as the outer diameter of the lower flange 38. A short tube portion 40A is integrally formed at an axial center portion of the upper flange 40. An outer diameter of the short tube portion 40A corresponds with an inner diameter of the tube portion 34. In a state in which the short tube portion 40A is fitted into an upper end vicinity of the tube portion 34, the upper flange 40 is fixed to the reel hub 32, so as to be coaxial therewith, by ultrasonic welding.

Figure 5:
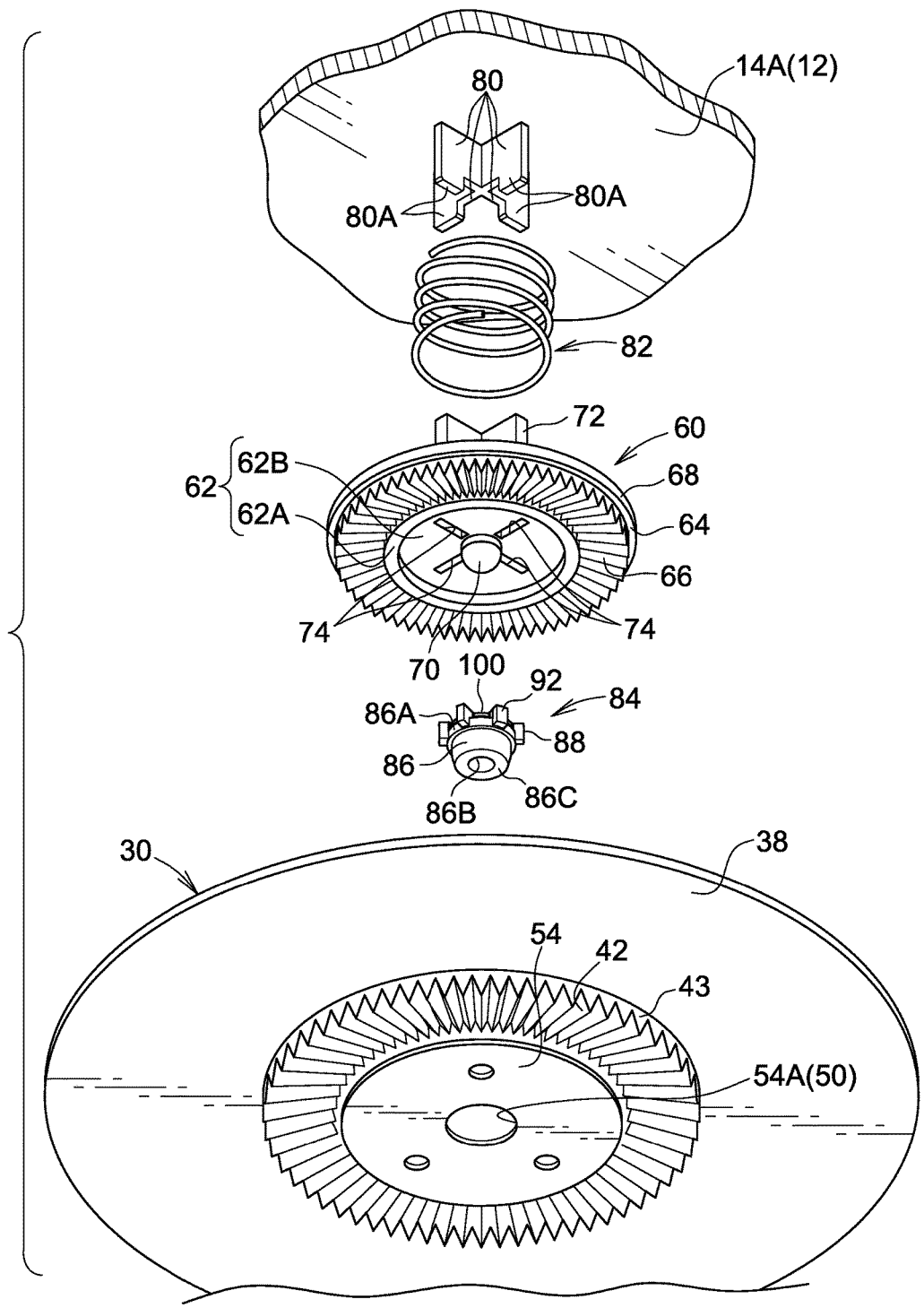
FIG. 5 is an exploded perspective view showing the locking member that structures the recording tape cartridge in accordance with the exemplary embodiment of the present invention, viewed from below.

Thus, a structure is formed in which the magnetic tape T is wound onto the outer periphery face of the tube portion 34 of the reel hub 32 of the reel 30 between opposing faces of the lower flange 38 and the upper flange 40. Even though the upper flange 40 is provided, the tube portion 34 is open to upward. Meanwhile, as shown in FIG. 1B and FIG. 5, the reel gear 42 is formed at an outer periphery vicinity of a lower face of the bottom portion 36 of the reel hub 32. The annular reel gear 42 is coaxial with the reel 30 as a whole.

The reel gear 42 is formed to be meshable with a driving gear 108 that is provided at the distal end of a rotary shaft 106 of the drive device. The rotary shaft 106 is described below. Portions of teeth of the reel gear 42 at the diametric direction outer sides thereof are connected with one another, from tooth height direction middle portions to tooth bases, by a taper portion 43 that is continuous with the lower flange 38.

As shown in FIG. 4, an annular engaging gear 44 is formed at an outer periphery vicinity of the upper face of the bottom portion 36 of the reel hub 32. The engaging gear 44 serves as an engaging portion that is coaxial with the reel 30 as a whole. The engaging gear 44 is formed on an annular seat portion 46 that projects a little from the upper face of the bottom portion 36. The engaging gear 44 is formed to be meshable with a braking gear 66 of a locking member 60, which is described below.

A plural number of upright ribs 48 are provided at the diametric direction outer side of the engaging gear 44, including the seat portion 46. The upright ribs 48 are spaced equidistantly in the circumferential direction. Each of the upright ribs 48 is continuous with the inner periphery face of the tube portion 34 and the upper face of the bottom portion 36, and runs along the axial direction of the reel 30. Because the upright ribs 48 are present, the engaging gear 44 is disposed at the diametric direction inner side relative to the reel gear 42. The functioning of the upright ribs 48 is described together with the locking member 60 below.

As shown in FIG. 2 to FIG. 5, a penetrating hole 50 is formed penetrating through the bottom portion 36 of the reel hub 32 at an axial center portion of the bottom portion 36. A clutch boss portion 52 is provided standing from the upper face of the bottom portion 36. The clutch boss portion 52 is provided in a short tubular shape along an edge portion of the penetrating hole 50. The clutch boss portion 52 is described together with a clutch member 84 below.

A reel plate 54 is coaxially and integrally provided by insert-molding in the lower face of the bottom portion 36 of the reel hub 32, at the inner side of the reel gear 42. The reel plate 54 is an annular plate formed of a magnetic material. A through-hole 54A is formed at an axial center portion of the reel plate 54. An inner diameter of the through-hole 54A is slightly smaller than an inner diameter of the penetrating hole 50.

As shown in FIG. 2 and FIG. 3, in the state in which the reel 30 is accommodated in the case 12, the reel 30 rests on the annular rib 22 at times of non-use. Specifically, outer side portions of the taper portion 43 of the bottom portion 36 of the reel 30 abut against an upper end face of the annular rib 22. The upper end face of the annular rib 22 is formed as a taper surface 22A that corresponds with the taper portion 43. Thus, movement of the reel 30 in the diametric direction is restricted.

In this state, the reel 30 is disposed completely inside the case 12, with the reel gear 42, the reel plate 54 and the like being exposed through the gear aperture 20 (see FIG. 1B). That is, the reel gear 42 faces outside the case 12 through the gear aperture 20 without protruding lower than the outer face of the floor plate 16A.

Therefore, operation of the reel 30, which is to say chucking and rotary driving, from outside the case 12 is possible. In the same state, an annular restricting rib 56, which is provided standing from the ceiling plate 14A, is inserted into an upper portion of the tube portion 34 of the reel 30. An outer periphery face of the restricting rib 56 is made to be close to the inner periphery face of the short tube portion 40A of the upper flange 40. Thus, the restricting rib 56 prevents loose movements of the reel 30 inside the case 12.

The recording tape cartridge 10 is also provided with the locking member 60, which locks rotation of the reel 30 at times of non-use. As shown in FIG. 4, the locking member 60 includes a main body portion 62. The main body portion 62 is formed substantially in the shape of a circular tube with an upper portion, which opens downward. The main body portion 62 is formed of a tube portion 62A, which is formed in a short tubular shape, and a disc portion 62B, which closes off the upper end of the tube portion 62A. The outer diameter of the tube portion 62A is set to be smaller than an inner diameter of the engaging gear 44, and the inner diameter of the tube portion 62A is set to be larger than an outer diameter of the clutch boss portion 52.

A linking portion 64 that is formed in an annular shape is provided protruding to the diametric direction outer side from an axial direction middle portion of an outer periphery portion of the main body portion 62 (the tube portion 62A), over the entire circumference thereof. As shown in FIG. 5, the braking gear 66 is provided at a lower face of the linking portion 64, over the entire circumference. That is, the braking gear 66 is formed in an annular shape. The braking gear 66 is structured to be meshable with the engaging gear 44 of the reel 30.

Inner end portions of teeth that structure the braking gear 66 are connected with one another by the tube portion 62A. Outer end portions of these teeth are disposed slightly to the diametric direction inner side relative to an outer edge of the linking portion 64. As is shown in FIG. 4, an annular reinforcing rib 68 is provided standing from the upper face of the linking portion 64, along an outer edge portion thereof. The reinforcing rib 68 assures stiffness of the linking portion 64 (the braking gear 66).

As shown in FIG. 5, a sliding protrusion portion 70 is provided protruding from an axial center portion of the lower face of the disc portion 62B of the main body portion 62. A distal end portion of the sliding protrusion portion 70 is formed in a substantially spherical surface shape, so as to make substantial point contact with a metallic plate 100 (a touching surface 100A) of the clutch member 84, which is described below. The distal end of the sliding protrusion portion 70 is disposed slightly upward relative to the lower end face of the tube portion 62A.

As shown in FIG. 4 and FIG. 5, a cross projection 72 is provided standing from the upper face of the disc portion 62B. An insertion slot 72A with a substantial cross shape in plan view is formed inside the cross projection 72. Penetrating holes 74 that penetrate through the disc portion 62B in the plate thickness direction thereof are provided inside the insertion slot 72A. The penetrating holes 74 are formed as four rectangular holes along the insertion slot 72A, excluding an axial center portion (an intersection portion) of the insertion slot 72A. That is, the penetrating holes 74 are each formed adjacent to the diametric direction outer side of the sliding protrusion portion 70.

An annular rib 76 is provided at an upper end outer periphery portion of the main body portion 62. The upper face of the disc portion 62B between the rib 76 and the cross projection 72 serves as a spring holding surface 78 against which one end portion of a compression coil spring 82, which is described below, abuts. Thus, the locking member 60 is insertedly provided inside the tube portion 34 of the reel hub 32, to be substantially coaxial therewith and movable in an up-and-down direction (the axial direction of the reel 30).

That is, the locking member 60 is capable of assuming a locking position and an allowing position by moving in the up-and-down direction. In the locking position, the braking gear 66 is meshed with the engaging gear 44 of the reel hub 32. In the allowing position, this meshing is released. A length of the tube portion 62A is determined such that a lower end face thereof does not abut against the bottom portion 36 when the locking member 60 is disposed at the locking position (see FIG. 2).

As shown in FIG. 2 to FIG. 5, a cross rib 80 is provided protruding downward from the ceiling plate 14A of the case 12. The cross rib 80 enters into the insertion slot 72A of the cross projection 72 of the locking member 60. The cross rib 80 is formed in a detent shape in which two thin plates intersect with one another so as to be orthogonal. By engaging with the cross projection 72 (i.e., slot walls of the insertion slot 72A), the cross rib 80 blocks rotation of the locking member 60 relative to the case 12.

Therefore, the locking member 60 may block rotation of the reel 30 by the braking gear 66 of the locking member 60 meshing with the engaging gear 44 of the reel hub 32. The state in which the cross rib 80 enters into the insertion slot 72A is maintained over the entire movement stroke of the locking member 60 in the up-and-down direction. Thus, the cross rib 80 is a structure that implements a function of guiding the direction of movement of the locking member 60 in the up-and-down direction.

Four projection pieces 80A are formed at a lower end portion of the cross rib 80. The projection pieces 80A are provided to protrude in correspondence with the penetrating holes 74 of the locking member 60. Respective widths of the projection pieces 80A (lengths thereof in the diametric direction of the locking member 60) are set to correspond with length direction dimensions of the penetrating holes 74. Thus, the projection pieces 80A are structures that may enter into respectively different holes of the penetrating holes 74.

That is, the projection pieces 80A are disposed inside the insertion slot 72A when the locking member 60 is disposed at the locking position (see FIG. 2), and the projection pieces 80A penetrate through the respective penetrating holes 74 and protrude beyond the lower face of the disc portion 62B when the locking member 60 is disposed at the allowing position (see FIG. 3). Because the projection pieces 80A are provided, an engagement amount of the cross rib 80 with the locking member 60 (an insertion depth) is increased, and tilting of the locking member 60 relative to the case 12 may be suppressed or prevented.

The locking member 60 is structured such that, when the locking member 60 is disposed at the locking position, movement of the reel 30 in the diametric direction is restricted by the upright ribs 48 but, when the locking member 60 is disposed at the allowing position, there is no danger of interference between the locking member 60 and the upright ribs 48 rotating together with the reel 30. Accordingly, upper portions of the upright ribs 48 are cut away such that the upright ribs 48 are disposed close to the reinforcing rib 68 when the locking member 60 is disposed at the locking position but separations between the upright ribs 48 and the reinforcing rib 68 are at least a predetermined value when the locking member 60 is disposed at the allowing position.

Thus, the reel 30 is formed such that movement thereof is directly restricted by the case 12 (the annular rib 22 and the restricting rib 56), and such that movement in the diametric direction relative to the case 12 is restricted via the locking member 60 in a vicinity of the position of the center of gravity. Therefore, the recording tape cartridge 10 may be reliably loaded even into a drive device that is disposed in an upright arrangement (i.e., with the axial direction of the reel 30 in a horizontal direction).

The compression coil spring 82 is disposed between the spring holding surface 78 of the locking member 60 and the ceiling plate 14A, to serve as an urging member. The one end portion of the compression coil spring 82 abuts against the spring holding surface 78 and another end portion of the compression coil spring 82 abuts against the ceiling plate 14A. An annular wall portion 58 is provided protruding from the ceiling plate 14A at the outer side relative to the cross rib 80. The other end portion of the compression coil spring 82 is disposed at the inner side of the annular wall portion 58 such that the other end portion of the compression coil spring 82 does not become displaced in the diametric direction.

The locking member 60 is urged downward by an urging force of the compression coil spring 82. Thus, at usual times the braking gear 66 is meshed with the engaging gear 44 and unintended rotation of the reel 30 is blocked. In addition, the reel 30 is urged downward by the urging force via the locking member 60, and the reel 30 abuts against the annular rib 22 so as not to move loosely inside the case 12.

As shown in FIG. 2 to FIG. 5, the recording tape cartridge 10 is further provided with the clutch member 84 that serves as a release member that is operated from outside the recording tape cartridge 10 when the state of locking of the reel 30 by the locking member 60 is to be released. The clutch member 84 is formed of a resin material such as polyamide (PA), polyacetal (POM) or the like. The clutch member 84 is disposed between the bottom portion 36 of the reel 30 and the locking member 60 so as to close off the penetrating hole 50.

Describing this more specifically, the clutch member 84 includes a clutch main body 86 formed in a substantially circular shaft shape. An outer diameter of the clutch main body 86, excluding a projecting portion 86A that is described below, is set to be slightly smaller than the inner diameter of the penetrating hole 50. The projecting portion 86A is formed at an upper end portion of the clutch main body 86. The projecting portion 86A projects a little to the diametric direction outer side over the whole circumference of the clutch main body 86. The metallic plate 100 that usually abuts against the sliding protrusion portion 70 of the locking member 60 is mounted at an upper end face of the clutch main body 86 including the projecting portion 86A. Details of the structure of the metallic plate 100 are described below.

A hollowed cavity 86B that opens downward is formed at an axial center portion of the clutch main body 86. A flat lower end face around the hollowed cavity 86B serves as a pushing surface 86C. As is described in detail below, the clutch member 84 is a structure that, in the event that the pushing surface 86C is pushed upward, moves upward in opposition to the urging force of the compression coil spring 82 and moves the locking member 60 to the allowing position.

The clutch member 84 is also provided with rotation restricting ribs 88 that project to the diametric direction outer side relative to an outer periphery face of the projecting portion 86A (of the clutch main body 86). Three of the rotation restricting ribs 88 are provided, spaced equidistantly in the circumferential direction of the clutch main body 86. Thus, the rotation restricting ribs 88 are arranged in a radiating pattern in plan view. The rotation restricting ribs 88 are formed continuously over both an upper end face of the clutch main body 86 and the outer periphery face of the projecting portion 86A. Thus, the rotation restricting ribs 88 protrude upward and to the diametric direction outer side.

The rotation restricting ribs 88 respectively enter into rotation restricting slots (guide slots) 90 that are formed at an inner edge portion of the clutch boss portion 52. The rotation restricting slots 90 open upward at the upper end of the clutch boss portion 52. Thus, the rotation restricting ribs 88 of the clutch member 84 are guided by the rotation restricting slots 90 and movement of the clutch member 84 in the up-and-down direction is enabled.

When the clutch member 84 moves upward and the locking member 60 is disposed at the allowing position, the rotation restricting ribs 88 maintain the state in which the same enter into the rotation restricting slots 90. Therefore, the clutch member 84 is a structure that always rotates integrally with the reel 30.

The clutch member 84 is further provided with seating ribs 92 that function as a stopper portion for blocking a fall from the reel hub 32 and allowing the metallic plate 100 to abut against the locking member 60 disposed at the locking position. Three of the seating ribs 92 are provided, at circumferential direction intermediate portions between the respective rotation restricting ribs 88 of the clutch main body 86. Thus, the seating ribs 92 are arranged in a radiating pattern in plan view. The seating ribs 92 are formed continuously over both the upper end face of the clutch main body 86 and the outer periphery face of the projecting portion 86A. Thus, the seating ribs 92 protrude upward and to the diametric direction outer side.

The seating ribs 92 respectively enter into stopper slots 94 that are formed at the inner edge portion of the clutch boss portion 52. The stopper slots 94 open upward at the upper end of the clutch boss portion 52. Lower bottom faces that close off lower end portions of the stopper slots 94 serve as stopper faces 94A. When the locking member 60 is disposed at the locking position, the clutch member 84 is positioned by lower end faces of the seating ribs 92 abutting against the stopper faces 94A, such that the metallic plate 100 is usually caused to abut against the sliding protrusion portion 70.

Thus, because the rotation restricting ribs 88 and the seating ribs 92 are provided separately from one another, the clutch member 84 is a structure in which a guiding function and a rotation restriction function are separated from a function of restricting movement in the axial direction of the reel 30. The clutch member 84 includes the metallic plate 100 at the upper end face of the clutch main body 86 including the projecting portion 86A.

Figure 6:
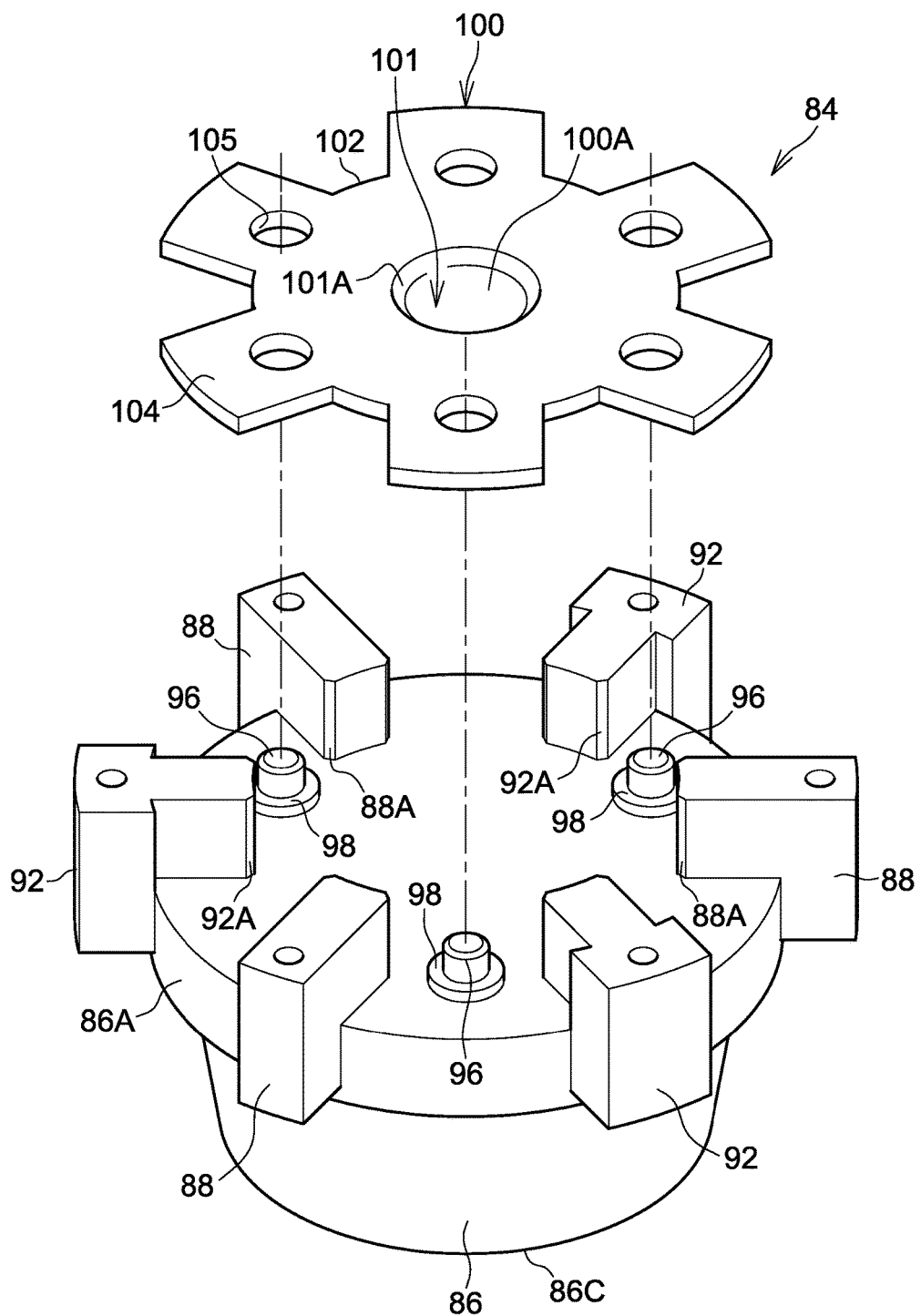
FIG. 6 is an exploded perspective view showing a metallic plate and clutch member that structure the recording tape cartridge in accordance with the exemplary embodiment of the present invention.

As shown in FIG. 6, three projection portions 96 for welding are integrally provided protruding from the upper end face of the clutch main body 86. The projection portions 96 are spaced equidistantly in the circumferential direction and are disposed between the respective rotation restricting ribs 88 and seating ribs 92. The metallic plate 100 that, together with the clutch main body 86, structures the clutch member 84 includes a disc portion 102 and ear portions 104. A sunken portion 101 that is sunk downward is formed at an axial center portion of the disc portion 102. The ear portions 104 are provided extending to the diametric direction outer side from outer periphery portions of the disc portion 102.

Six of the ear portions 104 are provided in a radial pattern, equidistantly spaced in the circumferential direction. The ear portions 104 are formed to enter between the respective rotation restricting ribs 88 and seating ribs 92. To facilitate this entry, corner portions at the diametric direction inner sides of the rotation restricting ribs 88 and the seating ribs 92 are cut away, forming chamfer portions 88A and 92A. Hole portions 105 through which the projection portions 96 can be inserted are formed in the ear portions 104. The hole portions 105 penetrate through the ear portions 104 in the plate thickness direction thereof.

Accordingly, the projection portions 96 are inserted into, of the six hole portions 105 in the ear portions 104, three of the hole portions 105 that are alternatingly disposed. In this state, the projection portions 96 (principally, portions thereof that protrude beyond the upper face of the metallic plate 100) are each fused (welded) by ultrasonic oscillations. Thus, the metallic plate 100 is fixed to the upper end face of the clutch main body 86, including the projecting portion 86A.

Annular portions 98 are coaxially and integrally formed at bases of the projection portions 96. The annular portions 98 serve as reference portions that support the metallic plate 100 from below. The annular portions 98 are formed to protrude upward from the upper end face of the clutch main body 86 in circular column shapes with larger diameters than the hole portions 105. Upper end faces of the annular portions 98 are formed to a higher precision than the upper end face of the clutch main body 86.

Figure 7:
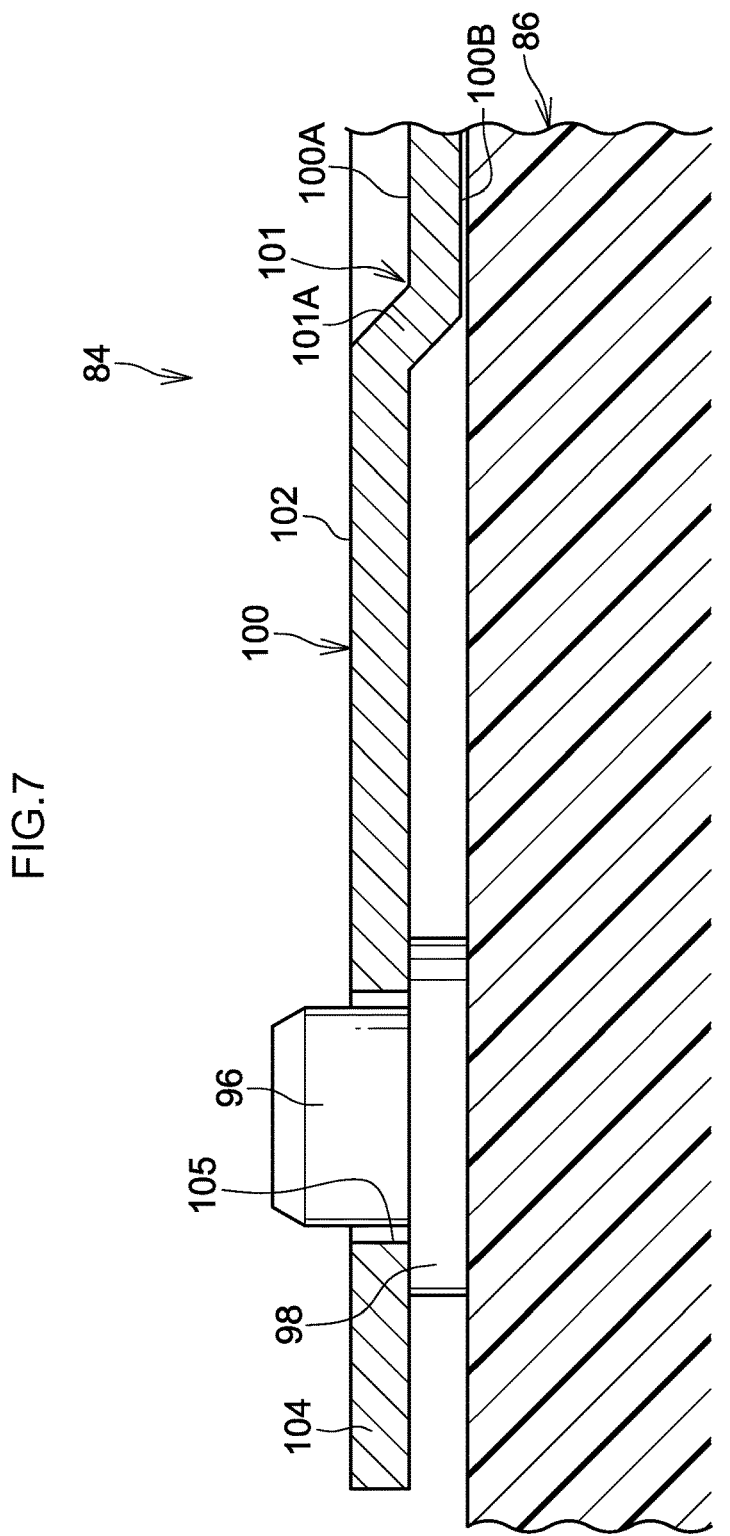
FIG. 7 is a sectional diagram showing a partial magnification of a state in which the metallic plate that structures the recording tape cartridge in accordance with the exemplary embodiment of the present invention is assembled to the clutch member.

Thus, when the metallic plate 100 has been mounted to the clutch main body 86, a lower face 100B of the sunken portion 101 of the metallic plate 100 is not in contact with the upper end face of the clutch main body 86 (see FIG. 7). That is, the metallic plate 100 is supported only by the three annular portions 98. As a result, a position of the metallic plate 100 in the axial direction of the reel 30 relative to the pushing surface 86C of the clutch member 84 is positioned.

Protrusion heights of the projection portions 96 from the upper end face of the annular portions 98 are specified so as to be larger than a plate thickness of the metallic plate 100 (see FIG. 7) and such that protrusion heights of the projection portions 96 from the upper face of the metallic plate 100 (excluding the touching surface 100A) in the welded state are lower than the rotation restricting ribs 88 and the seating ribs 92. Thus, a structure is formed in which, even if the locking member 60 is tilted, the sliding protrusion portion 70 does not interfere with the welded projection portions 96.

The metallic plate 100 is punched from a flat sheet of stainless steel by pressing using a punch and die. Thus, the disc portion 102 including the sunken portion 101 and the ear portions 104 including the hole portions 105 are formed integrally. The upper face inside the sunken portion 101 formed in the disc portion 102 (a floor face) is finished to a mirror surface by mechanical machining (grinding, polishing or the like), electroplating, coating or the like, to form the touching surface 100A that abuts against the sliding protrusion portion 70 of the locking member 60.

The touching surface 100A of the metallic plate 100 is formed in a circular shape with a larger diameter than the distal end portion of the sliding protrusion portion 70. The surface roughness of the touching surface 100A is an arithmetic mean roughness (Ra) of not more than 0.1 μm, specifically within a range of 0.01 μm to 0.1 μm. The plate thickness of the metallic plate 100 is in a range from 0.05 mm to 0.7 mm, is preferably in a range from 0.1 mm to 0.5 mm, and is more preferably in a range from 0.2 mm to 0.3 mm.

The numerical range of the plate thickness of the metallic plate 100 is specified to strike a balance between reducing plate thickness, which is desired to assure a release stroke of the locking member 60 by the clutch member 84, and preventing bending, which is desired in regard to assurance of dimensional precision and ease of assembly. Moreover, if a plural number of the metallic plate 100 are stacked in the plate thickness direction as illustrated in FIG. 8, during transport or the like, the touching surface 100A of one of the metallic plates 100 at a lower side is not in contact with the lower face 100B of the sunken portion 101 of another of the metallic plates 100 at an upper side.

Figure 8:
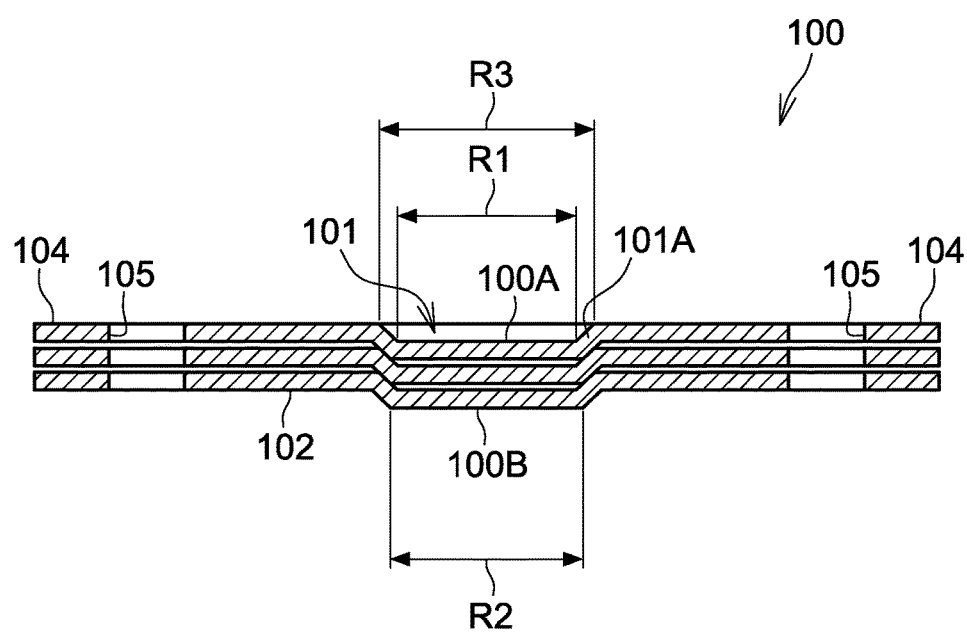
FIG. 8 is a sectional diagram showing a situation in which a plural number of the metallic plate that structures the recording tape cartridge in accordance with the exemplary embodiment of the present invention are stacked.

Moreover, even if a plural number of the metallic plate 100 are stacked in the plate thickness direction as illustrated in FIG. 8, an upper peripheral surface of a peripheral wall 101A, that forms the sunken portion 101, of the metallic plate 100 at a lower side contacts with a lower peripheral surface of a peripheral wall 101 A of the sunken portion 101 of a metallic plate 100 at an upper side.

That is, a relationship between a diameter R1 of the touching surface 100A inside the sunken portion 101, a diameter R2 of the lower face 100B of the sunken portion 101 and a diameter R3 of an upper edge portion of the sunken portion 101 (i.e., the periphery wall 101A) is R1<R2<R3. Therefore, the touching surface 100A of the metallic plate 100 at the lower side does not touch against the lower face 100B of the sunken portion 101 of the metallic plate 100 at the upper side.

In a state in which the rotation restricting ribs 88 and seating ribs 92 of the clutch member 84 that is structured thus are inserted into the respectively different rotation restricting slots 90 and stopper slots 94, the clutch main body 86 of the clutch member 84 is inserted through the penetrating hole 50 and the through-hole 54A. Hence, at usual times, the seating ribs 92 are retained in a state of abutting against the stopper faces 94A by the urging force of the compression coil spring 82 that acts thereon via the locking member 60. In this state, the lower end faces of the rotation restricting ribs 88 are slightly separated from the bottom faces of the rotation restricting slots 90.

Further, in this state, the upper portion of the clutch member 84 and the clutch boss portion 52 enter into the tube portion 62A of the locking member 60. With the clutch boss portion 52, the tube portion 62A forms a labyrinthine structure such that the ingression of dust through the penetrating hole 50 into the reel hub 32 (the case 12) is suppressed. In addition, while there is no functional need for the seating ribs 92 to enter into the stopper slots 94, the ingression of dust into the reel hub 32 is suppressed by the seating ribs 92 entering the stopper slots 94.

As illustrated in FIG. 2 and FIG. 3, in association with an operation of the reel gear 42 meshing with the driving gear 108 provided at the rotary shaft 106 that serves as an operation member at a drive device, the pushing surface 86C of the clutch member 84 is pushed by a release surface 114A of the rotary shaft 106 and moves upward. Thus, in the state in which the reel gear 42 is meshed with the driving gear 108, the clutch member 84 is kept in the state in which the pushing surface 86C abuts against the release surface 114A, and the locking member 60 is retained at the allowing position.

During rotation of the reel 30, there is no relative rotation between the clutch member 84 rotating integrally with the reel 30 and the rotary shaft 106 driving the reel 30. However, the clutch member 84 and the locking member 60, that is non-rotatable relative to the case 12, relatively rotate. Therefore, the touching surface 100A of the metallic plate 100 and the distal end of the sliding protrusion portion 70 are in sliding contact with one another.

A holding bolt 112 is provided at the rotary shaft 106. An upper end face of a head portion 114 of the holding bolt 112 serves as the release surface 114A that abuts against the pushing surface 86C of the clutch member 84. A height of the release surface 114A may be adjusted by changes to a threading amount of the holding bolt 112 in a threaded hole.

A magnet 110 is provided at the rotary shaft 106, for attracting and retaining the reel plate 54. The release surface 114A is finished to flatness equal to or flatter than an upper face of the magnet 110. Thus, a structure is formed in which a position of the release surface 114A relative to the pushing surface 86C is determined in the axial direction of the reel 30 and the attitude of the clutch member 84 whose pushing surface 86C is pushed by the release surface 114A is stable.

Now, operations of the recording tape cartridge 10 structured as described above are described.

At times of non-use of the recording tape cartridge 10, the locking member 60 is disposed at the locking position by the urging force of the compression coil spring 82, and the braking gear 66 is meshed with the engaging gear 44. Therefore, rotation of the reel 30 relative to the case 12 is blocked. At these times, the reel gear 42 of the reel 30 is exposed through the gear aperture 20, and the clutch main body 86 of the clutch member 84 is inserted through the penetrating hole 50 and the through-hole 54A and faces the gear aperture 20.

When the magnetic tape T is to be used, the recording tape cartridge 10 is loaded in the direction of arrow A into a bucket (not shown in the drawings) of a drive device. When the recording tape cartridge 10 has been loaded in the bucket to a predetermined depth, the bucket descends. The rotary shaft 106 of the drive device relatively moves toward the gear aperture 20 of the case 12 and retains the reel 30.

To be specific, the magnet 110 of the rotary shaft 106 attracts and retains the reel plate 54 without contact therewith, and the driving gear 108 meshes with the reel gear 42 which is exposed through the gear aperture 20. In association with this meshing of the reel gear 42 with the driving gear 108, the release surface 114A is abutted against the pushing surface 86C of the clutch member 84 and the rotary shaft 106 pushes the clutch member 84 upward.

Accordingly, the clutch member 84 is moved to the upper side in the axial direction of the reel 30 in opposition to the urging force of the compression coil spring 82 by this pushing force, while the rotation restricting ribs 88 of the clutch member 84 are guided by the rotation restricting slots 90. As a result, the locking member 60 that is abutting against the metallic plate 100 of the clutch member 84 at the sliding protrusion portion 70 moves upward, and the meshing between the braking gear 66 of the locking member 60 and the engaging gear 44 is released.

When the rotary shaft 106 relatively moves further upward, the reel 30 is lifted upward together with the clutch member 84 and the locking member 60 against the urging force of the compression coil spring 82. When the locking member 60 reaches the allowing position, the lower flange 38 is separated from the annular rib 22. In this manner, the reel 30 rises inside the case 12 and becomes rotatable in a state of non-contact with the inner faces of the case 12.

The respective positioning pins of the drive device enter into the positioning holes 24 and 26 of the case 12 when the recording tape cartridge 10 descends in the drive device, and the positioning surfaces of the drive device abut against the positioning surfaces 24A and 26A of the case 12. Thus, the recording tape cartridge 10 is positioned in the horizontal directions and the vertical direction relative to the drive device.

Correspondingly, a pull-out pin (not shown in the drawings) of the pull-out member of the drive device is engaged with the engaging slot portion 28A of the leader block 28, and the leader block 28 is disengaged from the case 12 and guided to the take-up reel of the drive device. The leader block 28 is fitted into the take-up reel and the circular arc face 28B structures a portion of the take-up surface onto which the magnetic tape T is to be taken up.

In this state, when the leader block 28 rotates integrally with the take-up reel, the magnetic tape T is taken up onto a reel hub of the take-up reel while being pulled out from the case 12 through the aperture 18. At this time, the reel 30 of the recording tape cartridge 10 is rotated in synchrony with the take-up reel by rotary force of the rotary shaft 106, which is transmitted by the driving gear 108 that is meshed with the reel gear 42.

Data is recorded onto the magnetic tape T and/or data recorded on the magnetic tape T is replayed by a recording/replay head that is disposed along a predetermined tape path in the drive device. At this time, the sliding protrusion portion 70 of the locking member 60, rotation of which relative to the case 12 is blocked, slidingly contacts the metallic plate 100 of the clutch member 84 that is rotating relative to the case 12 together with the reel 30.

That is, the distal end of the sliding protrusion portion 70 that is constituted of the resin material abuts against the touching surface 100A in the sunken portion 101 of the metallic plate 100. Therefore, even if a rotation speed of the reel 30 (a conveyance speed of the magnetic tape T) is increased in order to shorten access times to desired recording positions and data, wear of the sliding protrusion portion 70 that is sliding in accordance with the rotation of the reel 30 is suppressed compared to a clutch member (not shown in the drawings) that does not include the metallic plate 100.

Furthermore, the metallic plate 100 is supported only by the annular portions 98 that are coaxially and integrally formed at the bases of the three projection portions 96 that are provided equidistantly in the circumferential direction of the clutch main body 86. Therefore, the position of the touching surface 100A of the metallic plate 100 in the axial direction of the reel 30 is positioned accurately relative to the pushing surface 86C of the clutch member 84, and flatness of the touching surface 100A relative to the pushing surface 86C is assured. Consequently, tilting of the touching surface 100A of the metallic plate 100 relative to the sliding protrusion portion 70 of the locking member 60 is suppressed or prevented, and the production of noise during the rotation of the reel 30 is suppressed.

Even if the metallic plate 100 is plurally stacked during transport or the like, the touching surface 100A of any of the metallic plates 100 does not touch the lower face 100B of the sunken portion 101 of another of the metallic plates 100. Thus, the touching surface 100A is protected until the metallic plate 100 is attached to the clutch main body 86 and assembled into the case 12. Therefore, damage (abrasion, scratches and the like) to the touching surface 100A or suchlike is suppressed or prevented.

Therefore, during the rotation of the reel 30, disorder in the behavior of the clutch member 84 relative to the sliding protrusion portion 70 of the locking member 60 is suppressed or prevented, and occurrences of the sliding protrusion portion 70 of the locking member 60 receiving, for example, diametric direction force components from the touching surface 100A of the metallic plate 100 are suppressed or prevented. Consequently, the production of noise during the rotation of the reel 30 may be suppressed or prevented.

In particular, if the surface roughness of the touching surface 100A in the sunken portion 101 of the metallic plate 100 is an arithmetic mean roughness of not more than 0.1 μm, disorder in the behavior of the clutch member 84 may be further suppressed or prevented. Thus, the production of noise during the rotation of the reel 30 may be even more effectively suppressed or prevented.

Moreover, if the surface roughness of the touching surface 100A in the sunken portion 101 of the metallic plate 100 is an arithmetic mean roughness of not more than 0.1 μm, there is a benefit in that the material of the metallic plate 100 need not be limited to expensive stainless steel. That is, the metallic plate 100 may be fabricated of a metallic material that is cheaper than stainless steel, and costs relating to the metallic plate 100 may be reduced.

Then, when the magnetic tape T has been wound back to the reel 30 and the leader block 28 is retained in the vicinity of the aperture 18 of the case 12, the bucket in which the recording tape cartridge 10 is loaded ascends. Correspondingly, the meshing between the reel gear 42 and the driving gear 108 is released, the abutting of the release surface 114A against the pushing surface 86C of the clutch member 84 is released, and the clutch member 84 is moved downward together with the locking member 60 by the urging force of the compression coil spring 82.

Consequently, the seating ribs 92 of the clutch member 84 abut against the stopper faces 94A and the braking gear 66 of the locking member 60 meshes with the engaging gear 44. That is, the locking member 60 returns to the locking position that blocks rotation of the reel 30 relative to the case 12. Meanwhile, in association with the operation in which the locking member 60 and the clutch member 84 are moved by the urging force of the compression coil spring 82, the reel 30 also moves downward and returns to the initial state in which the lower flange 38 abuts against the annular rib 22 while the reel gear 42 is exposed through the gear aperture 20. In this state, the recording tape cartridge 10 is ejected from the bucket.

Figure 9A:
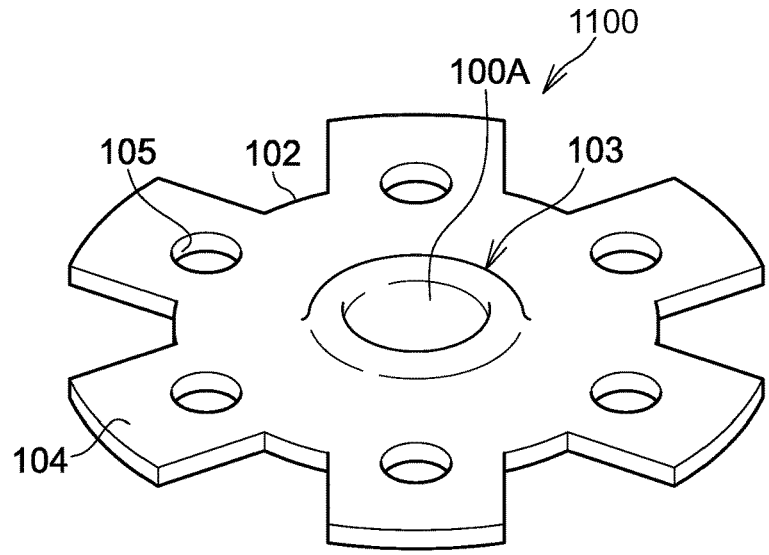
FIG. 9A is a perspective view showing a variant example of the metallic plate that structures the recording tape cartridge in accordance with the exemplary embodiment of the present invention.

While the operation of the recording tape cartridge 10 relating to the present exemplary embodiment is as described above, the metallic plate 100 may be formed as shown in FIG. 9A. That is, the metallic plate 1100 includes an annular protrusion portion 103 around the touching surface 100A of the disc portion 102. The protrusion portion 103 has a circular arc shape in cross section that protrudes in the plate thickness direction (upward in the case shown in FIG. 9B). When a plural number of this metallic plate 1100 are stacked, because of the protrusion portions 103, the touching surface 100A of one of the metallic plates 1100 at a lower side is not in contact with the lower face 100B of one of the metallic plates 1100 at an upper side.

Figure 9B:
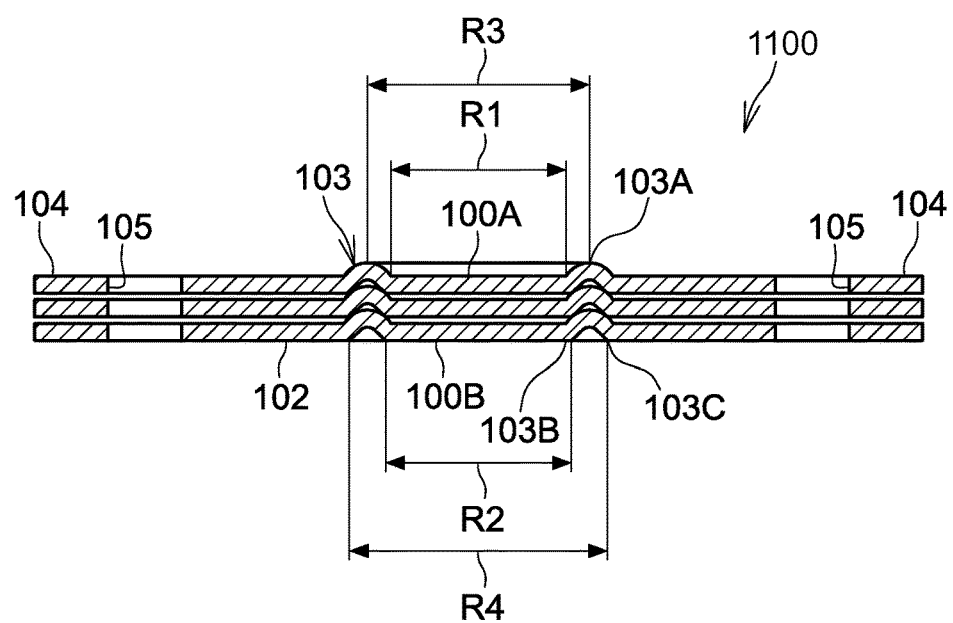
FIG. 9B is a sectional diagram showing a situation in which a plural number of the metallic plate according to the variant example that structure the recording tape cartridge in accordance with the exemplary embodiment of the present invention are stacked.

To describe this in more detail, the curvature, height and the like of the protrusion portion 103 are suitably determined such that, when the metallic plate 1100 is plurally stacked in the plate thickness direction as shown in FIG. 9B, an upper surface of the protrusion portion 103 of the metallic plate 1100 at the lower side, excluding a peak portion 103A, touches a diametric direction inner side edge portion (hereinafter referred to as "the inner edge portion") 103B and a diametric direction outer side edge portion (hereinafter referred to as "the outer edge portion") 103C that are formed at the metallic plate 1100 at the upper side by the formation of the protrusion portion 103 thereof.

That is, a relationship between the diameter R1 of the touching surface 100A, the diameter R2 of the lower face 100B (at the inner edge portion 103B), a diameter R3 of the peak portion 103A, and a diameter R4 of the outer edge portion 103C is R1<R2<R3<R4. Hence, the touching surface 100A of the metallic plate 1100 at the lower side does not touch against the lower face 100B of the metallic plate 1100 at the upper side.

If the protrusion portion 103 is formed continuously in the annular shape, there is an advantage in that there is no need for positioning of the protrusion portion 103 in the circumferential direction when the metallic plates 100 are being stacked. However, this is not limiting; structures are possible in which, for example, the protrusion portion 103 is discontinuously and plurally formed along a predetermined circumference. Furthermore, the protrusion portion 103 is not limited to a structure that is formed in a circular arc shape in cross section but may be formed in, for example, a substantial inverted "V" shape in cross section. Further yet, the protrusion portion 103 may be a structure that protrudes downward.

Figure 10:
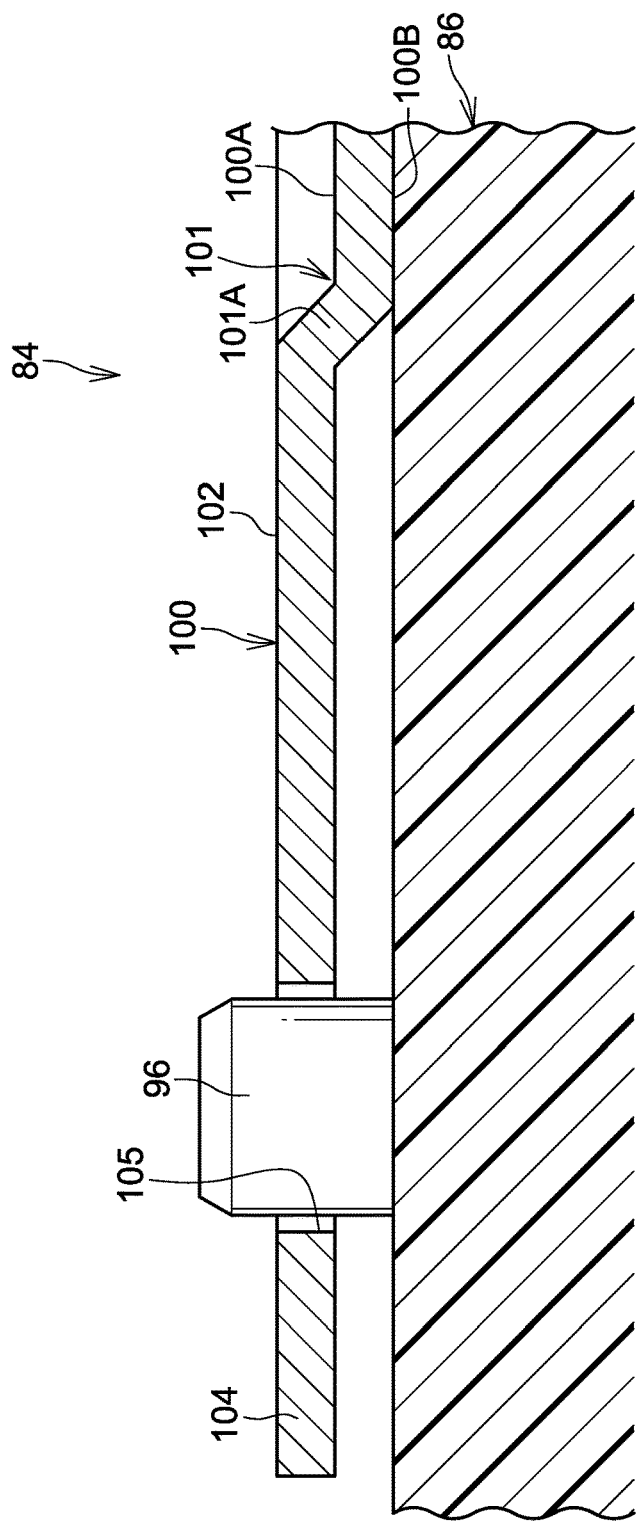
FIG. 10 is a sectional diagram showing a partial magnification of another variant example in the state in which the metallic plate that structures the recording tape cartridge in accordance with the exemplary embodiment of the present invention is assembled to the clutch member.

As shown in FIG. 10, the clutch member 84 may be formed without the annular portions 98 being formed at the bases of the three projection portions 96 provided at the clutch main body 86. When, for example, the metallic plate 100 illustrated in FIG. 6 to FIG. 8 is mounted at this clutch member 84, it is sufficient if the lower face 100B of the sunken portion 101 is in contact with the upper end face of the clutch main body 86. That is, the position of the metallic plate 100 in the axial direction of the reel 30 relative to the pushing surface 86C of the clutch member 84 is positioned by the upper end face of the clutch main body 86 in this case.

In the metallic plate 100 according to the present exemplary embodiment, the hole portions 105 are provided at all six of the ear portions 104. Therefore, positioning of the hole portions 105 at the projection portions 96 that would be required if the hole portions 105 were provided at only three of the ear portions 104 is not needed; the projection portions 96 may be reliably inserted into the hole portions 105 simply by the ear portions 104 being inserted between the rotation restricting ribs 88 and the seating ribs 92. Therefore, even in an automatic assembly process, the metallic plate 100 may be easily positioned relative to the clutch member 84.

Hereabove, the metallic plate 100 and the recording tape cartridge 10 according to the present exemplary embodiment have been described in accordance with the drawings. However, the metallic plate 100 and the recording tape cartridge 10 according to the present exemplary embodiment are not limited by the drawings. Suitable design modifications may be applied within a scope not deviating therefrom in the present invention.

For example, the number of the projection portions 96 is not limited to three; four or more of the projection portions 96 may be formed. That is, it is sufficient that at least three of the projection portions 96 and the hole portions 105 are formed. Further, the projection portions 96 are not limited to the structures that are formed in substantially circular column shapes and may be formed in, for example, substantially square column shapes or the like.

Although not shown in the drawings, the metallic plate 100 may be applied to an alternative release member such as, for example, a release pad with a substantially triangular shape in plan view in which three release projections protrude from above the reel gear 42, or the like. In the case of a release pad, a plane joining the three release projections serves as the pushing surface. Further, if the ear portions 104 are not formed at the metallic plate 100, due to an alternative shape of the release member, it is sufficient if the hole portions 105 are simply formed in the vicinity of a peripheral edge portion of the metallic plate 100.

In the present exemplary embodiment, the metallic plate 100 is structured with the disc portion 102, but this is not limiting. For example, the metallic plate 100 may be a structure that includes a plate portion with a square shape, an equilateral triangle shape or the like. Further, the shape of the sunken portion 101, the protrusion portion 103 or the like formed at the metallic plate 100 is a circular shape (or an annular shape) in plan view but this is not limiting; these may be formed in, for example, a polygonal shape or the like. Further yet, although the surface roughness of the touching surface 100A of the metallic plate 100 is set to an arithmetic mean roughness of not more than 0.1 μm, this numerical value is not limiting.

In the present exemplary embodiment, the metallic plate 100 is a structure that is formed by punching, but a method of fabrication (machining) of the metallic plate 100 is not particularly limited. Further, the recording tape cartridge 10 according to the present exemplary embodiment is a structure that includes the leader block 28 to serve as the leader member, but this is not limiting. As examples, although not shown in the drawings, a structure that includes a leader pin with a substantially circular rod shape or a structure that includes a covering member that opens and closes the aperture 18 (a sliding door that moves along a predetermined straight line or circular arc, or the like) may be formed.

The present exemplary embodiment has a structure in which the magnetic tape T is used as the recording tape, but this is not limiting. It is sufficient to understand the recording tape as being an information recording/replaying medium in a long, narrow tape shape at which data may be recorded and recorded data may be replayed. The recording tape cartridge 10 according to the present exemplary embodiment is obviously applicable to recording tapes of any recording/replay format.

What is claimed is:

1. A recording tape cartridge comprising:
   a reel at which a recording tape is wound onto a reel hub whose shape is a circular tube with a bottom portion, the reel being rotatably accommodated in a case;
   a locking member that is provided in the reel hub to be movable in an axial direction of the reel, the locking member movable to a locking position, at which the locking member locks rotation of the reel, and an allowing position, at which the locking member allows rotation of the reel relative to the case;
   a release member that is provided in the reel hub to be integrally rotatable with the reel, the release member moving the locking member from the locking position to the allowing position in the event that the release member is pushed from an outer side of the case;
   a sliding protrusion portion that protrudes from the locking member toward the side thereof at which the release member is disposed; and
   a metallic plate being a structure of the release member, wherein:
   the metallic plate comprises:
      a sunken portion formed at a central region of a surface of the metallic plate, the surface being substantially orthogonal to a plate thickness direction of the metallic plate; and a touching surface formed at the sunken portion, and being to be touched by a distal end of the sliding protrusion portion;

wherein, if a plurality of the metallic plate are stacked in the plate thickness direction in a state in which the metallic plates are not attached to release members, the touching surface of each metallic plate is not in contact with any other of the metallic plates.

2. The recording tape cartridge according to claim 1, wherein the release member comprises:

at least three projection portions that fix the metallic plate to the release member, and at least three hole portions being formed in the metallic plate, the projection portions being inserted into the hole portions and fused; and annular portions that support the metallic plate, the annular portions being formed with larger diameters than the hole portions at bases of the projection portions.

\* \* \* \* \*